United States Patent [19]
Dorgnon

[11] 4,050,344
[45] Sept. 27, 1977

[54] EXPANSIBLE NAIL LIKE PLUG
[75] Inventor: Roger Dorgnon, St. Peray, France
[73] Assignee: Olin Corporation, New Haven, Conn.
[21] Appl. No.: 670,786
[22] Filed: Mar. 26, 1976
[30] Foreign Application Priority Data
    Apr. 25, 1975  France .................. 75.13071
[51] Int. Cl.² .................. F16B 13/04; F16B 15/04
[52] U.S. Cl. .................................. 85/68; 85/84
[58] Field of Search .......... 85/84, 83, 82, 68, 72, 85/71, 23

[56]                References Cited
              U.S. PATENT DOCUMENTS

| | | | |
|---|---|---|---|
| 734,326 | 7/1903 | Hicks | 85/83 |
| 938,875 | 11/1909 | Kobert | 85/23 |
| 998,781 | 7/1911 | Kobert | 85/84 |
| 1,580,569 | 4/1926 | Pleister et al. | 85/84 |
| 2,004,561 | 6/1935 | Becker et al. | 85/84 X |
| 2,326,855 | 8/1943 | Hathorn | 85/84 X |
| 2,424,602 | 7/1947 | Swart | 85/72 |
| 3,199,398 | 8/1965 | Weisz | 85/83 |
| 3,691,924 | 9/1972 | Baker | 85/82 X |

Primary Examiner—Ramon S. Britts
Attorney, Agent, or Firm—William W. Jones; Paul J. Lerner

[57] ABSTRACT

An expansible nail-like plug comprising a body whereof one part is separated into at least two portions by at least one substantially radial slot and an expansion core which moves apart the said portions on being driven into the said body. According to the invention, the said slot is interrupted prior to the front end of the said body, whereby the front unslotted end terminates in a point having, for example, a substantially conical or prismatic shape.

2 Claims, 4 Drawing Figures

EXPANSIBLE NAIL LIKE PLUG

The present invention relates to a new expansible plug which can be driven into materials having very different consistences and hardnesses.

Known plugs are intended to be used with relatively precisely defined materials, for example, concrete. These plugs are virtually unusable with different materials. This is particularly the case with plugs which can be expanded by driving in a cylindrical or conical core in order to expand one end of the plug which is divided into a plurality of portions by slots extending from one end of the plug up to an intermediate zone.

It is particularly desirable to have a single type of expansible plug which, depending on the particular material involved, can be driven in like a nail and then expanded or, on the contrary, can be inserted into a previously drilled hole. Plugs of this type would be particularly useful for fixing various devices, for example, traffic control strips onto asphalted highways laid on a substratum of widely differing types, such as for example, earth, free aggregates, concrete, etc.

The object of the present invention is to achieve this by means of a new plug which is simple and economic to manufacture.

The invention therefore has for its object an expansible nail-like plug comprising a body part of which is separated into at least two portions by one or more substantially radial slots and an expansion core which separates the said portions from one another when it is driven into the said member, wherein the slot terminates prior to the front end of the said member, and wherein the unslotted front end terminates in a point, for example, having a substantially conical or prismatic shape.

Due to the pointed configuration of the plug, it can be driven in without any previous drilling of a hole being necessary and without the portions delimited by the slot or slots separating during driving in. After fitting by driving in or in a previously drilled hole, the plug body is expanded by driving in the expansion core.

According to one embodiment of the invention, the slot or slots also terminate before the rear end of the plug body.

Preferably, the body has a blind axial channel extending from the rear end of the body up to an intermediate zone of the slots, whereby the channel cross-section is slightly greater than that of the expansion core.

To ensure that the user does not forget to introduce the expansion core, this core advantageously comprises a cylindrical shank with a pointed end whose length is greater than that of the blind axial channel in the body but less than the total hollowed out or slotted length of the said body, whereby the plug is supplied to the user with the shank in place in the axial channel and secured by a retaining means such as an adhesive or securing device.

In this case, the nail-like plug can be fitted by firstly positioning the body by acting solely on its upper free portion surrounding the cylindrical shank by employing successive blows then bringing about the expansion of the said body by driving in the shank by applying further successive blows to the upper portion thereof.

The invention will be better understood from reading the following description relative to a non-limitative embodiment of the invention with reference to the drawings in which.

Figure 1:
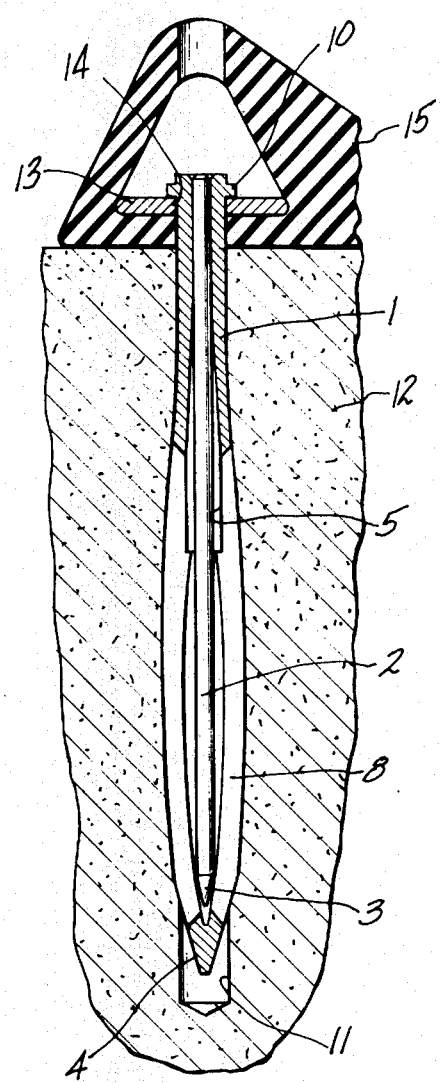
FIG. 1 is an axial sectional view of a nail-like plug according to one embodiment of the invention after expansion.
Figure 2:
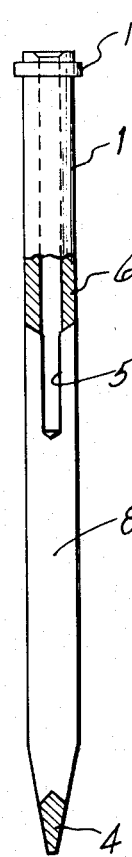
FIG. 2 is an elevational view partly in section of the nail-like plug body of FIG. 1.
Figure 3:
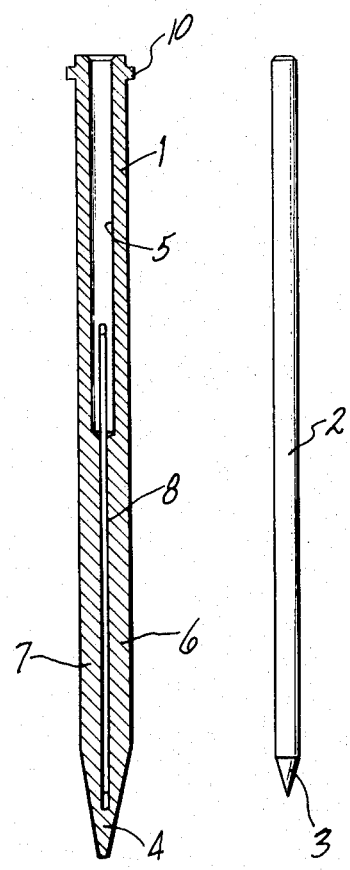
FIG. 3 is a sectional view of the body of FIG. 2, displaced by 90° relative thereto.
Figure 4:
FIG. 4 is an elevational view of the expansion core of the nail-like plug of the FIG. 1.

The nail-like plug according to the exemplified embodiment described comprises a body 1 expanded by means of a cylindrical shank 2 having a substantially conical point 3. The body has a pointed end 4 and from the opposite end to the said point and over approximately half its length is provided with a cylindrical blind bore 5 whose diameter is slightly greater than that of shank 2.

Between its two ends, body 1 is subdivided into two portions 6 and 7 by means of a radial slot 8 which terminates short of the point 4. About a third of the length of the body starting from the end opposite to point 4 is unslotted. Body 1 is also provided with a peripheral flange 10 at its end opposite to point 4.

FIG. 1 shows the nail-like plug fitted in a hole 11 hollowed out of a material 12, whereby flange 10 is supported on a metal plate 13 perforated by holes 14, whereby the complete assembly serves for fitting a traffic control strip 15. By means of a driver comprising a recess corresponding at least to the projecting portion of expansion shank 2 the latter can be fitted at the same time as body 1, whereby its point 3 rests on the bottom of blind bore 5. As a variant, shank 2 can be introduced after fitting body 1. Shank 2 is then driven in by force, whereby its point 3 moves apart portions 6 and 7 of the plug body, which are radially expanded and ensure the anchoring of the nail-like plug.

Slots 8 and 9 can also be extended up to the end of body 1 opposite to point 3. This variant simplifies the manufacture of body 1 and also makes it possible to use larger diameter expansion shanks when material 12 requires a greater expansion.

What is claimed is:

1. An expansible nail-like plug comprising:
   a. an elongated body having a pointed end which can penetrate and form a blind hole in a supporting material upon application of blows to an opposite end thereof, said body having an axial bore extending from said opposite end for approximately one-half of the length of said body, and said body having at least one radial slot extending laterally through said body to form adjacent, expandible portions of said body, said radial slot extending for approximately two-thirds of the length of said body from said bore toward said pointed end, and said slot terminating short of said pointed end whereby the latter is uninterrupted, and said slot having a width which is smaller than the diameter of said bore; and
   b. an elongated expansion core having a pointed end and a cylindrical shank the diameter of which is sufficiently less than the diameter of said bore to permit ready insertion and removal of said core into and from said bore, said shank diameter being greater than the width of said slot and said core having a length which is greater than the length of said bore but less than the length of said elongated body, said core forming means for driving into said bore and slot operable to radially separate said body portions when said body is disposed in a blind hole in a supporting material to cause said body portions to grip the sides of the hole and cause said body to anchor in the blind hole.

2. The plug of claim 1 further comprising securement means for temporarily and releasably securing said core in said bore.

* * * * *

UNITED STATES PATENT OFFICE
CERTIFICATE OF CORRECTION

Patent No. 4,050,344          Dated Sept. 27, 1977

Inventor(s)    Roger Dorgnon

It is certified that error appears in the above-identified patent and that said Letters Patent are hereby corrected as shown below:

Col. 2, line 32: the word "Slots" should read --Slot--.

Col. 2, line 32: delete "and 9".

Col. 2, line 33: the number "3" should read --4--.

Signed and Sealed this

Fourth Day of November 1980

[SEAL]

Attest:

SIDNEY A. DIAMOND

Attesting Officer    Commissioner of Patents and Trademarks